United States Patent
Snyder et al.

(10) Patent No.: US 9,920,627 B2
(45) Date of Patent: Mar. 20, 2018

(54) ROTOR HEAT SHIELD

(71) Applicant: United Technologies Corporation, Hartford, CT (US)

(72) Inventors: Daniel A. Snyder, Manchester, CT (US); Christopher Corcoran, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 249 days.

(21) Appl. No.: 14/712,988

(22) Filed: May 15, 2015

(65) Prior Publication Data

US 2016/0376892 A1    Dec. 29, 2016

Related U.S. Application Data

(60) Provisional application No. 62/001,782, filed on May 22, 2014.

(51) Int. Cl.

| F01D 5/08 | (2006.01) |
| F04D 29/32 | (2006.01) |
| F01D 17/10 | (2006.01) |
| F04D 19/00 | (2006.01) |
| F04D 27/00 | (2006.01) |
| F04D 25/04 | (2006.01) |
| F01D 11/00 | (2006.01) |

(52) U.S. Cl.
CPC ............ *F01D 5/082* (2013.01); *F01D 5/081* (2013.01); *F01D 17/105* (2013.01); *F04D 19/002* (2013.01); *F04D 25/045* (2013.01); *F04D 27/009* (2013.01); *F04D 29/325* (2013.01); *F01D 11/008* (2013.01); *F05D 2220/32* (2013.01); *F05D 2260/2212* (2013.01); *F05D 2260/231* (2013.01); *Y02T 50/676* (2013.01)

(58) Field of Classification Search
CPC ........ F01D 5/081; F01D 5/082; F01D 5/3007; F01D 17/105; F01D 11/006; F01D 11/008
See application file for complete search history.

(56) References Cited

U.S. PATENT DOCUMENTS

| 3,008,689 A | * | 11/1961 | Cook ...................... F01D 5/323 416/193 A |
| 3,266,771 A | | 8/1966 | Morley |
| 3,709,631 A | * | 1/1973 | Karstensen ............... F01D 5/22 416/193 A |
| 4,439,107 A | | 3/1984 | Antonellis |

(Continued)

FOREIGN PATENT DOCUMENTS

EP    2578803    4/2013

OTHER PUBLICATIONS

Extended European Search Report for European Application No. 15168238.2, dated Sep. 15, 2015.

*Primary Examiner* — Igor Kershteyn
*Assistant Examiner* — Eric Zamora Alvarez
(74) *Attorney, Agent, or Firm* — Carlson, Gaskey & Olds, P.C.

(57) ABSTRACT

An assembly for a gas turbine that engine includes a fan section. A turbine section is configured to drive the fan section. The turbine section includes a rotor hub with a rotor lug. A heat shield engages the rotor lug. The heat shield and the rotor lug define a cooling passage.

19 Claims, 3 Drawing Sheets

(56) References Cited

U.S. PATENT DOCUMENTS

| | | | |
|---|---|---|---|
| 4,457,668 A * | 7/1984 | Hallinger | F01D 5/26 |
| | | | 416/190 |
| 4,470,757 A | 9/1984 | Vollinger | |
| 4,494,909 A * | 1/1985 | Forestier | F01D 5/22 |
| | | | 416/190 |
| 4,505,640 A | 3/1985 | Hsing et al. | |
| 4,505,642 A | 3/1985 | Hill | |
| 4,507,052 A | 3/1985 | Thompson | |
| 4,536,129 A | 8/1985 | Jankot | |
| 4,659,285 A | 4/1987 | Kalogeros et al. | |
| 4,875,830 A * | 10/1989 | Trousdell | F01D 11/008 |
| | | | 416/193 A |
| 5,201,849 A | 4/1993 | Chambers et al. | |
| 5,217,348 A | 6/1993 | Rup, Jr. et al. | |
| 5,281,097 A * | 1/1994 | Wilson | F01D 5/081 |
| | | | 415/115 |
| 5,339,619 A | 8/1994 | Antonellis | |
| 5,388,962 A | 2/1995 | Wygle et al. | |
| 5,599,170 A * | 2/1997 | Marchi | F01D 5/22 |
| | | | 416/190 |
| 5,630,703 A | 5/1997 | Hendley et al. | |
| 6,315,298 B1 * | 11/2001 | Kildea | F01D 11/006 |
| | | | 277/433 |
| 7,374,400 B2 * | 5/2008 | Boswell | F01D 5/084 |
| | | | 416/190 |
| 2014/0119916 A1 * | 5/2014 | Faulder | F01D 5/22 |
| | | | 416/95 |

\* cited by examiner

ROTOR HEAT SHIELD

CROSS-REFERENCE TO RELATED APPLICATIONS

This application claims priority to U.S. Provisional Application No. 62/001,782, which was filed on May 22, 2014 and is incorporated herein by reference.

STATEMENT REGARDING GOVERNMENT SUPPORT

This invention was made with government support under Contract No. FA8650-09-D-2923-0021 awarded by the United States Air Force. The government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Rotors in gas turbine engines have multiple rotor lugs that form slots for accepting blades. The slots include protrusions that engage complementary protrusions on each of the blades to retain the blades in the slots. During operation of the gas turbine engine, the rotors are subjected to substantial centrifugal forces and extreme temperatures from hot gases passing through and expanding in the turbine section. As the duration of operation and the temperature of the gases passing through the turbine section increases, a temperature of the blades and the rotor becomes elevated. Therefore, there is a need to cool portions of the turbine section.

SUMMARY

In one exemplary embodiment, an assembly for a gas turbine engine that includes a fan section. A turbine section is configured to drive the fan section. The turbine section includes a rotor hub with a rotor lug. A heat shield engages the rotor lug. The heat shield and the rotor lug define a cooling passage.

In a further embodiment of the above, the assembly includes at least one turbulent structure rotor lug that is configured to increase turbulence of a cooling fluid flowing through the cooling passage.

In a further embodiment of any of the above, at least one turbulent structure is integrally formed with the rotor lug.

In a further embodiment of any of the above, there is a compressor section with a bleed air source for providing a cooling fluid to the cooling passage.

In a further embodiment of any of the above, the rotor lug includes at least one rail located on a distal end thereof.

In a further embodiment of any of the above, the rotor lug includes a first rail and a second rail that extends from a distal end of the rotor lug.

In a further embodiment of any of the above, the heat shield includes a first hook to slidably engage the first rail and a second hook to slidably engage the second rail.

In a further embodiment of any of the above, the first hook and the second hook have a fillet radius between approximately 0.030 inches (0.762 mm) and 0.090 inches (2.286 mm).

In a further embodiment of any of the above, the first hook and the second hook have a non-circular fillet.

In a further embodiment of any of the above, the heat shield slidably engages the rotor hub.

In another exemplary embodiment, a rotor for a gas turbine engine includes a rotor hub including at least one rotor lug. A heat shield engages the at least one rotor lug. The heat shield and the rotor lug define a cooling passage.

In a further embodiment of the above, at least one turbulent structure is coupled to the lug and is configured to increase turbulence of a cooling fluid that flows through the cooling passage.

In a further embodiment of any of the above, at least one turbulent structure is located on at least one of the rotor hub or the heat shield.

In a further embodiment of any of the above, the lug includes a first rail and a second rail that extend from a radially outer end thereof.

In a further embodiment of any of the above, the heat shield includes a first hook to engage the first rail and a second hook to engage the second rail.

In a further embodiment of any of the above, the first hook and the second hook have a fillet radius between approximately 0.030 inches (0.762 mm) and 0.090 inches (2.286 mm).

In a further embodiment of any of the above, the heat shield slidably engages the first rail and the second rail.

In another exemplary embodiment, a method of cooling a rotor hub includes shielding heat from a rotor hub with a heat shield and directing a cooling fluid into a cooling passage defined between the rotor hub and the heat shield.

In a further embodiment of the above, the heat shield is mounted on a distal end of the rotor hub on a rotor lug.

In a further embodiment of any of the above, the rotor lug includes a first rail to engage a first longitudinal hook on the heat shield and a second rail to engage a second longitudinal hook on the heat shield.

In a further embodiment of any of the above, the cooling passage includes at least one turbulent structure that is configured to increase the turbulence of the cooling fluid.

In a further embodiment of any of the above, the method includes reflecting heat form the rotor hub with the heat shield.

The various features and advantages of this disclosure will become apparent to those skilled in the art from the following detailed description. The drawings that accompany the detailed description can be briefly described as follows.

DETAILED DESCRIPTION

Figure 1:
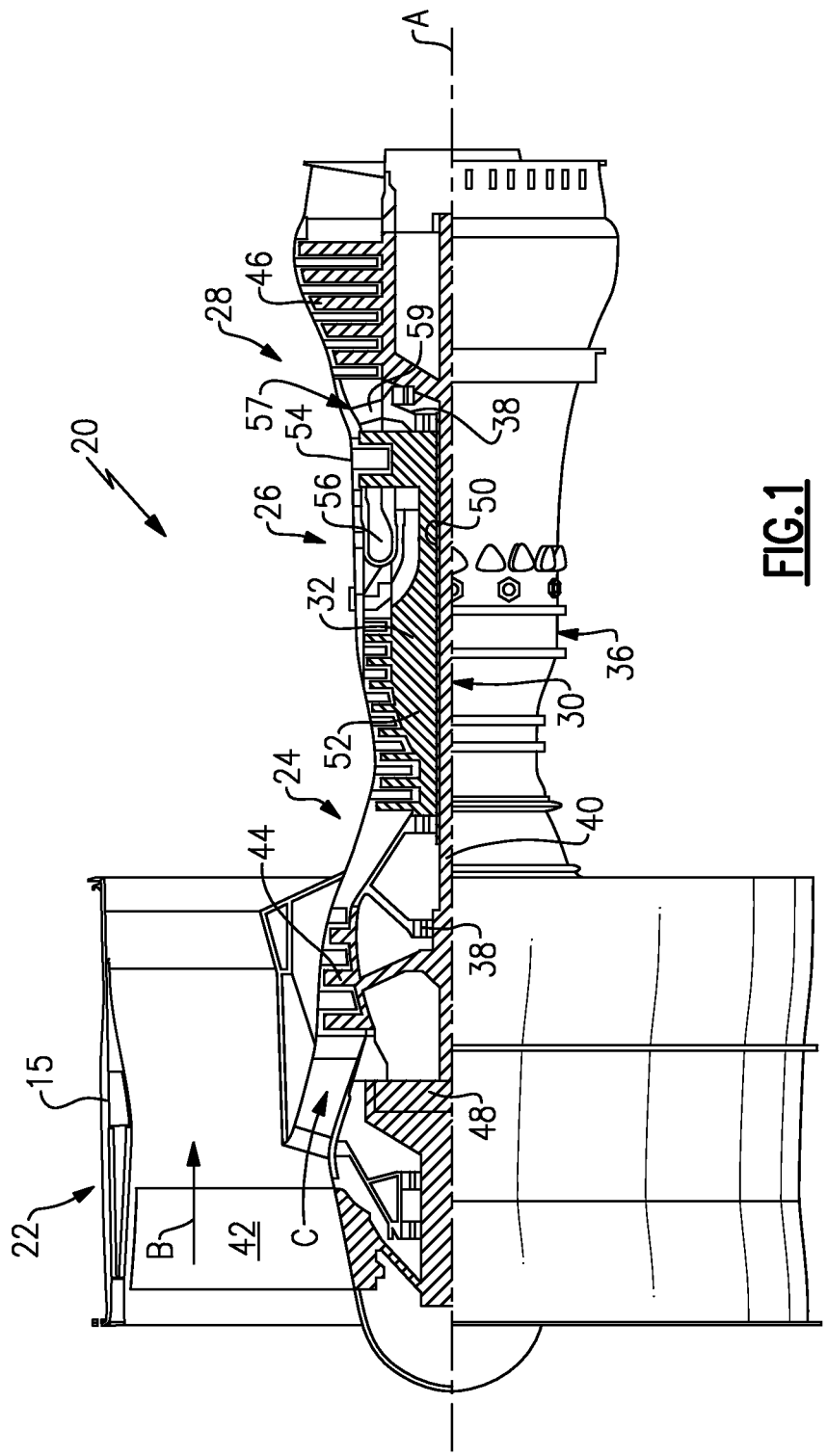
FIG. 1 illustrates a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
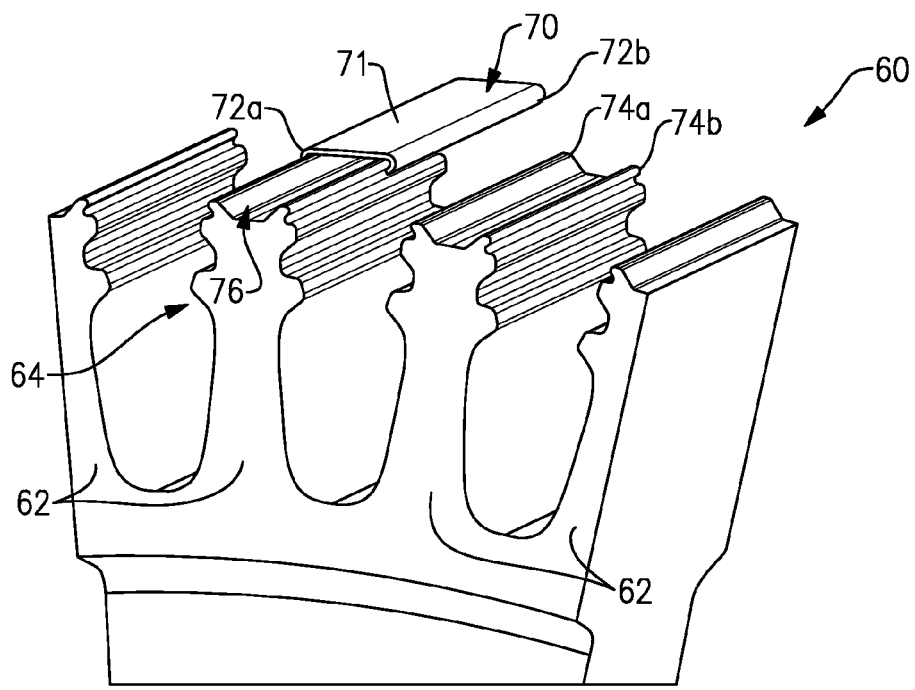
FIG. 2 illustrates a perspective view of a heat shield in a first position relative to a rotor hub.
Figure 3:
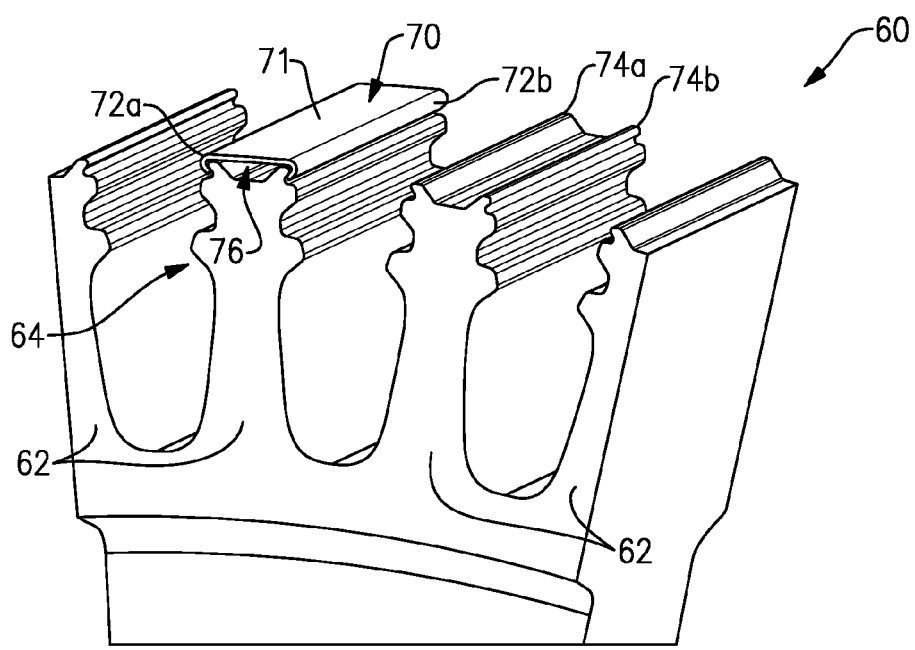
FIG. 3 illustrates a perspective view of the heat shield of FIG. 2 in a second position relative to the rotor hub.

As shown in FIGS. 2 and 3, a rotor hub 60 of the turbine section 28 includes multiple rotor lugs 62 spaced around a circumference of the rotor hub 60. A heat shield 70 slidably engages each of the rotor lugs 62 between a first position partially engaging the rotor lug 62 (FIG. 2) and a second position (FIG. 3) fully engaging the rotor lug 62. The heat shield 70 is located on a distal end of the rotor lugs 62.

The heat shield 70 reflects heat from the rotor blades 66 (FIG. 4) and hot gases passing through the turbine section 28 to reduce the temperature of the rotor hub 60. The heat shield 70 includes a generally planar portion 71 with a first longitudinal hook 72a on a first side of the planar portion 71 and a second longitudinal hook 72b on an opposite second side of the planar portion 71. Since the heat shield 70 is formed from a single piece of material that is substantially planar, the heat shield 70 has a substantially constant thickness.

Each of the lugs 62 includes a first rail 74a and a second rail 74b on the distal end of the rotor lug 62. The heat shield 70 is retained adjacent the distal end of the rotor lug 62 by engaging the first longitudinal hook 72a with the first rail 74a and the second longitudinal hook 72b with a second rail 74b. In the illustrated example, the first and second longitudinal hooks 72a and 72b and the first and second rails 74a and 74b are unbroken without any discontinuities and the first and second longitudinal hooks 72a and 72b have a fillet radius between approximately 0.030 inches (0.762 mm) and 0.090 inches (2.286 mm). Alternatively, the first and second longitudinal hooks 72a and 72b include a non-circular fillet.

The first and second rails 74a and 74b extend radially upward and outward from the distal end of rotor lugs 62. The rotor lug 62 (including the first and second rails 74a and 74b) and the heat shield 70 define a channel 76. Although the channel 76 in the illustrated example includes a generally trapezoidal cross section, other shapes such as rectangular or elliptical cross sections could be incorporated.

Figure 4:
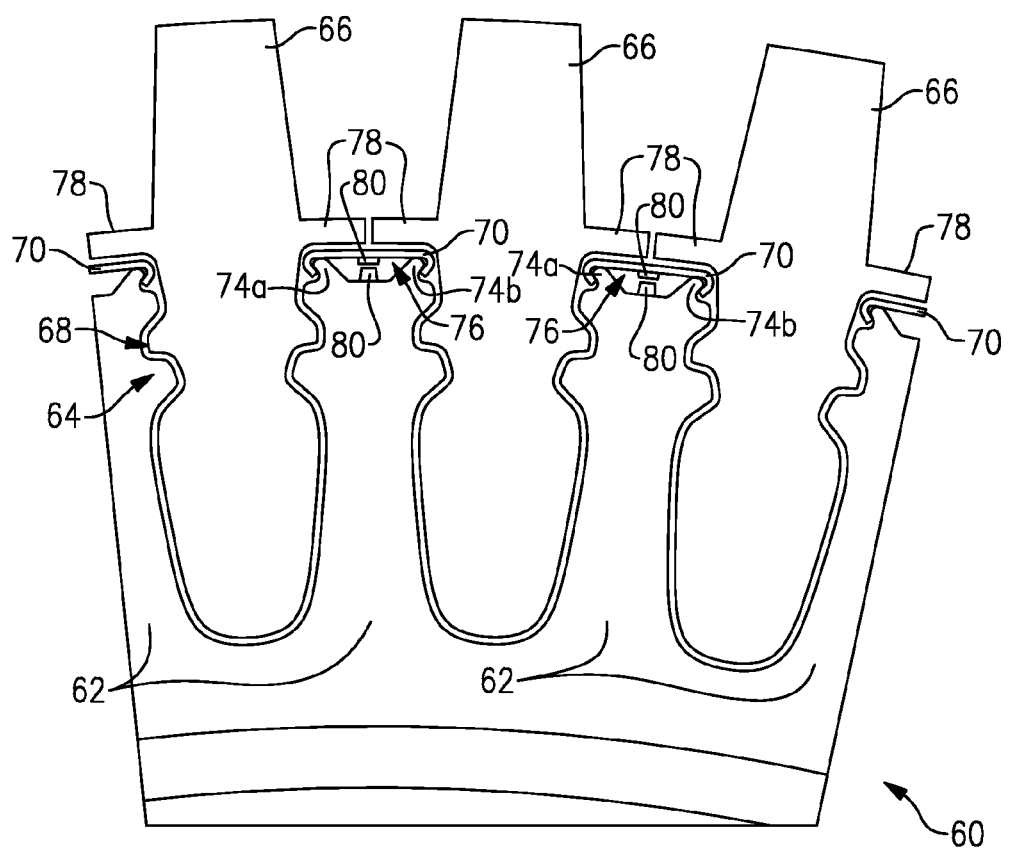
FIG. 4 illustrates an end view of the rotor hub and heat shield of FIG. 3.

The channel 76 is in fluid communication with bleed air from the compressor section 24 to cool the rotor lugs 62 along with the rotor hub 60. As shown in FIG. 4, the lugs 62 may include protrusions 80 (e.g., structure integrally formed with or separately attached to the lugs 62) extending into the channel 76 to increase the turbulence of the bleed air flowing through the channel 76 and the convective heat transfer between the bleed air and the rotor hub 62. (FIG. 4). The protrusions 80 may be attached to the rotor lugs 62 or the heat shield 76.

As shown in FIG. 4, rotor blades 66 are located on opposing sides of the rotor lug 62 and generally cover the heat shield 70. The rotor lugs 62 have a general "fir-tree" shape 64 for retaining complementary shaped protrusions 68 on the rotor blades 66 A platform section 78 on opposing sides of each of the rotor blades 66 is adjacent the heat shields 70 on adjacent rotor lugs 62.

By shielding the rotor hub 60 from excess heat and cooling it with bleed air passing through the channel 76, material from the rotor hub 60 can be removed because material strength is higher at lower temperatures.

Additionally, by attaching the heat shield 70 to the rotor hub 60 instead of the rotor blade 66, the centrifugal pull from a heat shield on the rotor blade 66 due to the increased weight from the heat shield will be eliminated because the load from the heat shield 70 will be carried by the rotor hub 60 instead of the rotor blades 66. This will also allow traditional support material, such as seal shelves from the base portion of the rotor blades 66 to be removed. Removal of the traditional support material reduces the centrifugal load experienced by a neck portion of the rotor blades 66.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An assembly for a gas turbine engine, the assembly comprising:
   a fan section;
   a turbine section configured to drive the fan section, the turbine section including a rotor hub with a rotor lug; and
   a heat shield engaging the rotor lug, wherein the heat shield includes a planar portion with a first longitudinal hook on a first side of the planar portion and a second longitudinal hook on an opposite second side of the planar portion, a radially inner side of the planar portion directly contacts the rotor lug, and the heat shield and the rotor lug define a cooling passage there between;
   wherein the rotor lug includes a first rail extending radially upward and outward from a distal end of the rotor lug for engaging the first longitudinal hook and a second rail extending radially upward and outward from distal end of the rotor lug for engaging the second longitudinal hook.

2. The assembly of claim 1, further comprising at least one turbulent structure located on the rotor lug and configured to increase turbulence of a cooling fluid flowing through the cooling passage.

3. The assembly of claim 2, wherein the at least one turbulent structure is integrally formed with the rotor lug.

4. The assembly of claim 1, further comprising a compressor section with a bleed air source for providing a cooling fluid to the cooling passage.

5. The assembly of claim 1, wherein the first longitudinal hook and the second longitudinal hook have a fillet radius between approximately 0.030 inches (0.762 mm) and 0.090 inches (2.286 mm).

6. The assembly of claim 1, wherein the first longitudinal hook and the second longitudinal hook have a non-circular fillet.

7. The assembly of claim 1, wherein the planar portion defines a radially outer side of the cooling passage and the rotor lug defines a radially inner side of the cooling passage.

8. The assembly of claim 1, wherein the first longitudinal hook defines a first fillet extending between a radially inner edge of the first longitudinal hook and a radially outer edge of the first longitudinal hook and the second longitudinal hook defines a second fillet extending between a radially inner edge of the second longitudinal hook and a radially outer edge of the second longitudinal hook.

9. A rotor for a gas turbine engine, comprising:
   a rotor hub including at least one rotor lug; and
   a heat shield engaging the at least one rotor lug, wherein the heat shield includes a planar portion with a first longitudinal hook on a first side of the planar portion and a second longitudinal hook on an opposite second side of the planar portion, a radially inner side of the planar portion directly contacts the rotor lug, and the heat shield and the rotor lug define a cooling passage there between;
   wherein the at least one rotor lug includes a first rail extending radially upward and outward from a distal end of the rotor lug for engaging the first longitudinal hook and a second rail extending radially upward and outward from distal end of the rotor lug for engaging the second longitudinal hook.

10. The rotor of claim 9, further comprising at least one turbulent structure coupled to the lug and configured to increase turbulence of a cooling fluid flowing through the cooling passage.

11. The rotor of claim 10, wherein the at least one turbulent structure is located on at least one of the rotor hub or the heat shield.

12. The rotor of claim 9, wherein the first hook and the second hook have a fillet radius between approximately 0.030 inches (0.762 mm) and 0.090 inches (2.286 mm).

13. The rotor of claim 9, wherein the planar portion defines a radially outer side of the cooling passage and the at least one rotor lug defines a radially inner side of the cooling passage.

14. The rotor of claim 9, wherein the first longitudinal hook defines a first fillet extending between a radially inner edge of the first longitudinal hook and a radially outer edge of the first longitudinal hook and the second longitudinal hook defines a second fillet extending between a radially inner edge of the second longitudinal hook and a radially outer edge of the second longitudinal hook.

15. A method of cooling a rotor hub, comprising:
   a) shielding heat from a rotor hub with at least one rotor lug with a heat shield, wherein the heat shield includes a planar portion with a first longitudinal hook on a first side of the planar portion and a second longitudinal hook on an opposite second side of the planar portion, a radially inner side of the planar portion directly contacts the at least one rotor lug and the at least one rotor lug includes a first rail extending radially upward and outward from a distal end of the rotor lug for engaging the first longitudinal hook and a second rail extending radially upward and outward from distal end of the rotor lug for engaging the second longitudinal hook; and
   b) directing a cooling fluid into a cooling passage defined between the rotor hub and the heat shield.

16. The method of claim 15, wherein the cooling passage includes at least one turbulent structure configured to increase the turbulence of the cooling fluid.

17. The method of claim 15, further including reflecting heat from the rotor hub with the heat shield.

18. The method of claim 15, wherein the planar portion defines a radially outer side of the cooling passage and the rotor hub defines a radially inner side of the cooling passage.

19. The method of claim 15, wherein the first longitudinal hook defines a first fillet extending between a radially inner edge of the first longitudinal hook and a radially outer edge of the first longitudinal hook and the second longitudinal hook defines a second fillet extending between a radially inner edge of the second longitudinal hook and a radially outer edge of the second longitudinal hook.

* * * * *